Sept. 21, 1926.
C. C. CLARK
1,600,799
PROTECTING FLAP FOR PNEUMATIC TIRES
Original Filed Oct. 3, 1921
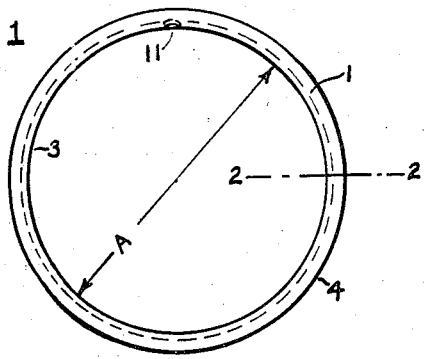
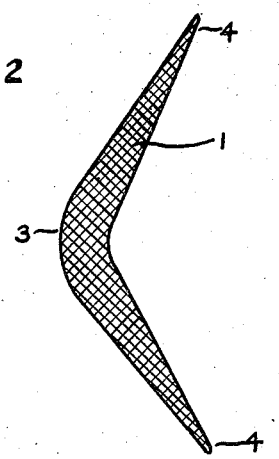
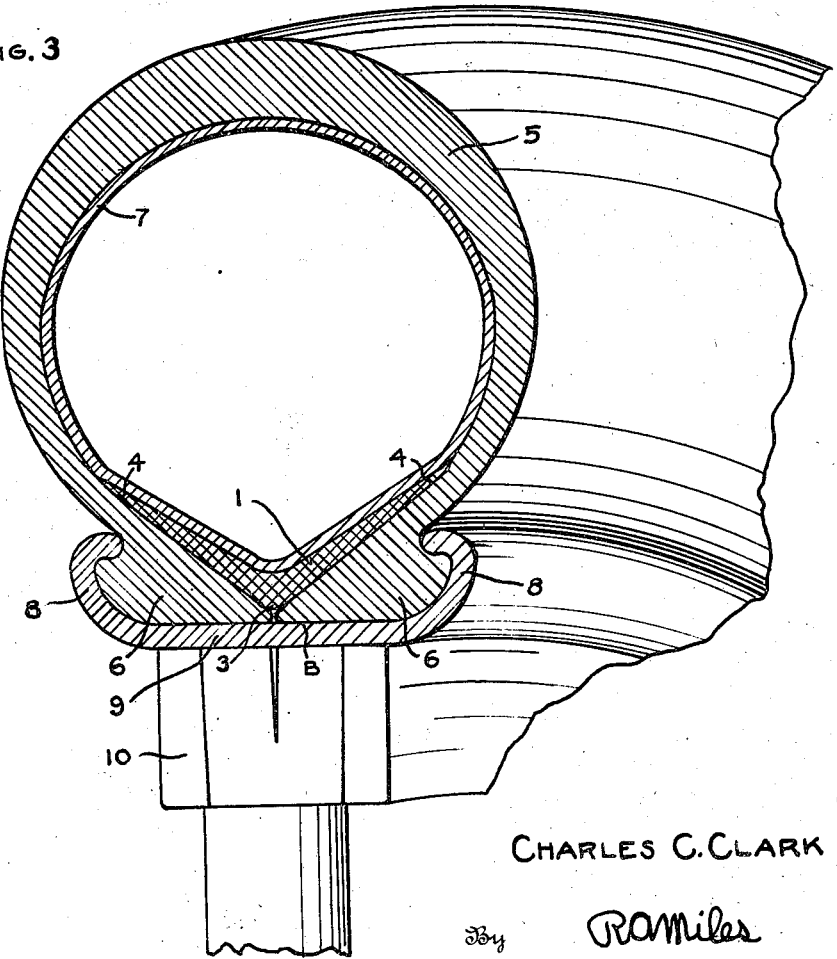
Inventor
CHARLES C. CLARK
By R.A.Miles
Attorney Patented Sept. 21, 1926.

1,600,799

UNITED STATES PATENT OFFICE.

CHARLES C. CLARK, OF WASHINGTON, DISTRICT OF COLUMBIA.

PROTECTING FLAP FOR PNEUMATIC TIRES.

Application filed October 3, 1921, Serial No. 505,109. Renewed June 6, 1925.

My invention relates to pneumatic tires of the double tube type for use on vehicles and in particular to a protector placed between the inner tube and the bead edges of the outer casing.

Such a protector is commonly known as a "tire flap" and is used to prevent the inner tube from coming in contact with the wheel rim and from being squeezed or chafed between the two sides of the outer casing where they are attached to the wheel rim.

The various types of protectors or flaps which have been previously produced and come into extensive use have usually been made of some flexible material such as heavy canvas or duck, or such a material impregnated with a rubber compound. The user of such a flap ordinarily made some preliminary attempt to place and adjust it smoothly in its proper position in the tire while the tire was deflated and detached from the wheel rim and relied upon the expansion of the inner tube upon inflation, when mounting the tire upon the rim, to actually seat the protector in its final working position.

Practical experience has demonstrated in a great many cases, particularly with tires mounted on "clincher" type rims, that due to the necessary manipulation and stretching of the tire involved in its mounting, that the flap, is liable to become misplaced or wrinkled and the inner tube is then subject to injury by blowing out or chafing when put in service.

The objects of my invention are therefore to provide a flap which may be easily inserted and arranged in the tire; which will readily conform itself to the variations in contour which occur in the tire while it is being mounted on the wheel rim or in service when not properly inflated; and which will effectually protect the inner tube from pinching or abrasion under the most unfavorable conditions.

Other objects of my invention will be apparent from the following description considered in connection with the drawings, and its scope is defined in the appended claims.

The more important characteristic features of the tire flap in which my invention is embodied are elasticity, self-adjustment, and softness. I attain these features by forming my improved tire flaps of an elastic material, such as soft vulcanized rubber, into a complete circle of a shape such as illustrated in the accompanying drawings, in which:—

Figure 1 is a side elevation of the flap itself; Figure 2 is a horizontal section on the line 2—2 of Figure 1 and Figure 3 is a fragmentary sectional view through a vehicle wheel with a tire and its protecting flap applied thereto; in Figure 1, the central portion, 3, of the flap, 1, is of an appreciable thickness, which tapers down to two feather edges, 4, so that a cross section of the flap on the line, 2—2, is normally of a mutilated crescent shape such as to accommodate itself to the interior of the casing as shown in Figure 2.

The free inside diameter of the central portion, 3, of the flap, 1, (designated by A in Figure 1) is predetermined so as to be somewhat less than the inside diameter of the tire casing with which it is to be used. By the inside diameter of the tire casing, I mean the measurement between opposite inside surfaces of the tire beads which I have marked B in Figure 3. A hole, 11, is provided to allow the valve stem of the inner tube to pass through.

My improved flap, although intended for general use, is particularly well suited to be used in a clincher type tire, such as shown in Figure 3, in which, 5, is the outer casing having two bead edges 6, 6, adapted to fit into and be held in place by the curved portions 8, 8, of the rim 9, carried on the wheel felloe 10, and 7, is the airtight inner tube which my improved flap is designed to protect. The specific form of the vehicle wheel, its felloe, and rim, as well as that of the pneumatic tire itself, may be of any usual kind or shape and they need not be more specifically described here.

In applying my protector flap to its intended use, the valve stem of the inner tube is first inserted through the hole 11; both are then roughly positioned within the outer casing; the tire is then mounted upon the wheel rim by starting the insertion of its beads into the clincher rim near the valve stem, continuing the insertion gradually on both sides, and finally stretching the remaining portion out and over the rim and allowing it to retract into its normal engaging position. The tire may be then inflated to its proper pressure.

After the flap has been positioned between the inner tube and the bead edges of the outer casing, and the operation of mounting the tire upon the wheel rim is in progress the possibility of further adjustment of the flap or of detecting and correcting any misplacement or wrinkling of the flap is at an end. The flap is incased by the tire and the rim, and is thus inaccessible.

Throughout this procedure the previously mentioned features of my device come into play. The elasticity of the flap allows it readily to follow the stretching of the tire, without radical displacement or wrinkling. Due to its predetermined circumference and shape the flap is biased to automatically seek its proper position midway between the tire beads upon the final engagement of the latter with the tire rim.

This self adjusting capability of my flap is due jointly to the facts that the flap has such a preformed cross-sectional shape as to readily nest inside the bead edges of the tire casing, and to the fact that the flap is stretched during the process of mounting the tire and thereafter remains under a circumferential tension. The tension is most strongly exerted by the central body portion of the flap and causes this central portion to seek the position of least circumference presented by the sloping inner sides of the outer casing. This position is obviously midway between the tire beads.

The flap being of practically the same consistency as the inner tube and having flexible and elastic edges, there is little tendency for it to chafe or cut the tube under any circumstances.

Having thus described my invention, what I claim and desire is to secure by Letters Patent of the United States, is:

1. In a pneumatic tire, the combination of an outer casing having bead edges, an inflatable inner tube, and an endless circular tire flap of firm elastic rubber interposed between said bead edges and said inner tube and having a central body portion from which taper two edge portions of gradually decreasing thickness and increasing circumference, said body portion having a free diameter less than the inside diameter of said outer casing whereby the tire flap is rendered self-adjusting.

2. In a demountable pneumatic tire, the combination of an outer casing having bead edges, an inflatable inner tube, and an endless self-adjusting tire flap of firm elastic rubber capable of conforming to the changing shape of the tire longitudinally and transversely during mounting, inflation, and use, and lying between and unconnected with the bead edges of said outer casing and said inner tube, and bridging the space between said bead edges, thereby preventing said inner tube from being pinched or chafed during mounting, inflation and use.

3. In a demountable pneumatic tire, the combination of an outer casing having bead edges, an inflatable inner tube, and a tire flap of firm elastic rubber having a preformed cross section of mutilated crescent shape, said tire flap being endless and having a free diameter less than the inside diameter of said outer casing, said tire flap being interposed between the bead edges of said outer casing and said inner tube and adapted when the tire is mounted to be longitudinally stretched and thereby rendered laterally self-adjusting in the tire.

4. A tire flap comprising an endless unitary ring of elastic rubber, said ring having a preformed cross section of mutilated crescent shape, with the points extending outwardly, and being of a lesser diameter than the tire, said tire flap being characterized by the facts that its elasticity, cross sectional shape, and relative diameter render it self-adjusting inside the mounted tire.

5. In a pneumatic tire, the combination of an outer casing having bead edges, an inflatable inner tube, and a circular tire flap of firm elastic rubber interposed between said bead edges and said inner tube and having a central body portion from which taper two edge portions of gradually decreasing thickness and increasing circumference, said body portion of the tire flap having, when assembled in the tire, a free diameter less than the inside diameter of said outer casing whereby the tire flap is rendered self-adjusting.

In testimony whereof I affix my signature.

CHARLES C. CLARK.